United States Patent [19]
Welch

[11] Patent Number: 5,624,314
[45] Date of Patent: Apr. 29, 1997

[54] COMBINATION OF CYLINDER BARS USED WITH A THRESHING CYLINDER

[76] Inventor: Terry J. Welch, 714 Prairie, St. John, Kans. 67576

[21] Appl. No.: 541,113

[22] Filed: Oct. 11, 1995

[51] Int. Cl.$^6$ .................................................. A01F 12/20
[52] U.S. Cl. ........................................................ 460/72
[58] Field of Search ............................. 460/72, 71, 108, 460/109, 110, 141, 901

[56] References Cited

U.S. PATENT DOCUMENTS

| | | | |
|---|---|---|---|
| 3,401,700 | 9/1968 | Karlsson | 460/110 |
| 3,927,679 | 12/1975 | Ausherman | 460/71 |
| 4,796,645 | 1/1989 | Kuchar | 460/71 |
| 5,083,977 | 1/1992 | Coers | 460/71 |
| 5,254,036 | 10/1993 | Johnson et al. | 460/71 |

*Primary Examiner*—Terry Lee Melius
*Attorney, Agent, or Firm*—Edwin H. Crabtree; Ramon L. Pizarro; Donald W. Margolis

[57] ABSTRACT

A combination of cylinder bars used with a backing plate for mounting on different lengths of threshing cylinders. The cylinders used with different models of combines for the threshing of grain, chaff and straw. The combination of cylinder bars includes a forward cylinder bar, a reverse cylinder bar and a center cylinder bar. The center cylinder bar is characterized by having both a forward and a reverse tooth configuration. Also, the center cylinder bar may be of various lengths depending on the length of the cylinder. Opposite side portions of the backing plate are bent to match the threshing cylinder radius. The backing plate includes bolt holes to match bolt holes on cylinder flanges on the threshing cylinder. Bolts are used to secure the backing plate to the cylinder. The three cylinder bars are mounted on a top portion of the backing plate. The top portion of the backing plate includes bolt holes to match the configuration of the bolt holes in the forward, reverse and center cylinder bar. Bolts are used for securing the cylinder bars to the backing plate. The combination of using one length of the forward cylinder bar, one length of the reverse cylinder bar and a center cylinder bar of different lengths eliminates the need of having a large inventory of various lengths of one piece.

14 Claims, 3 Drawing Sheets

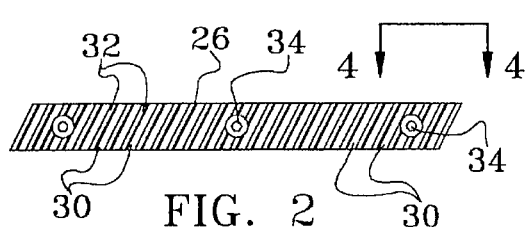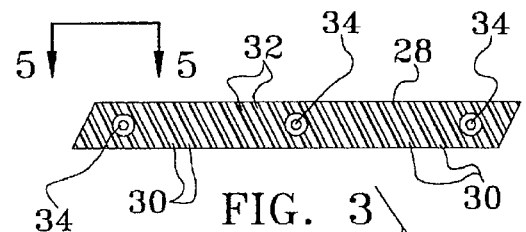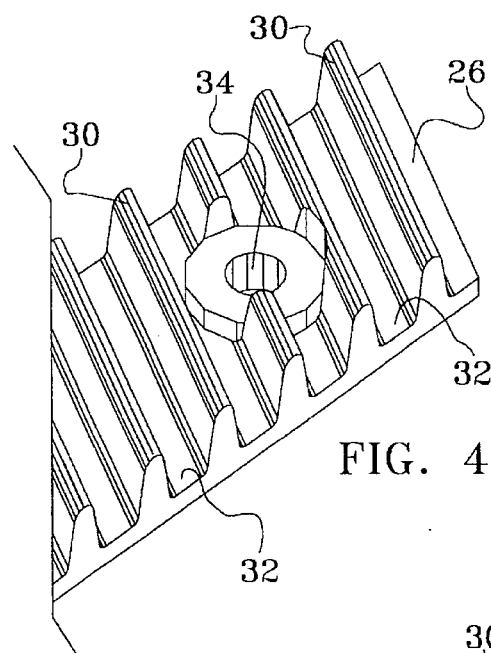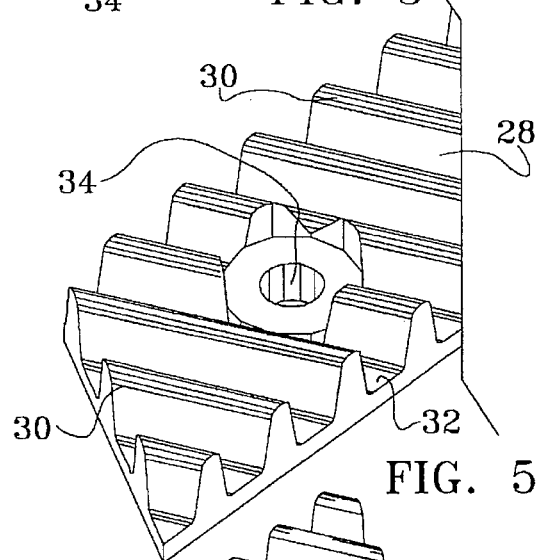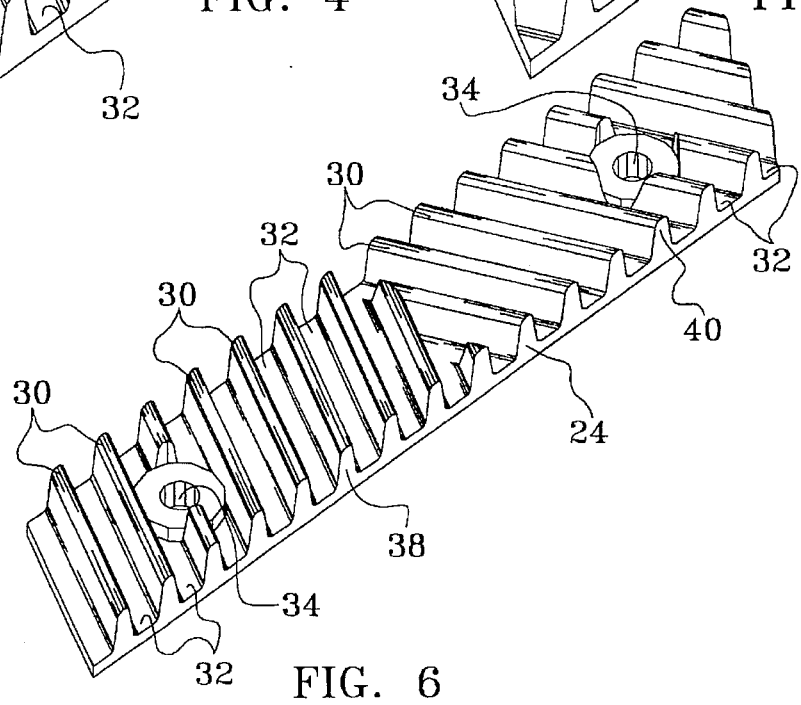

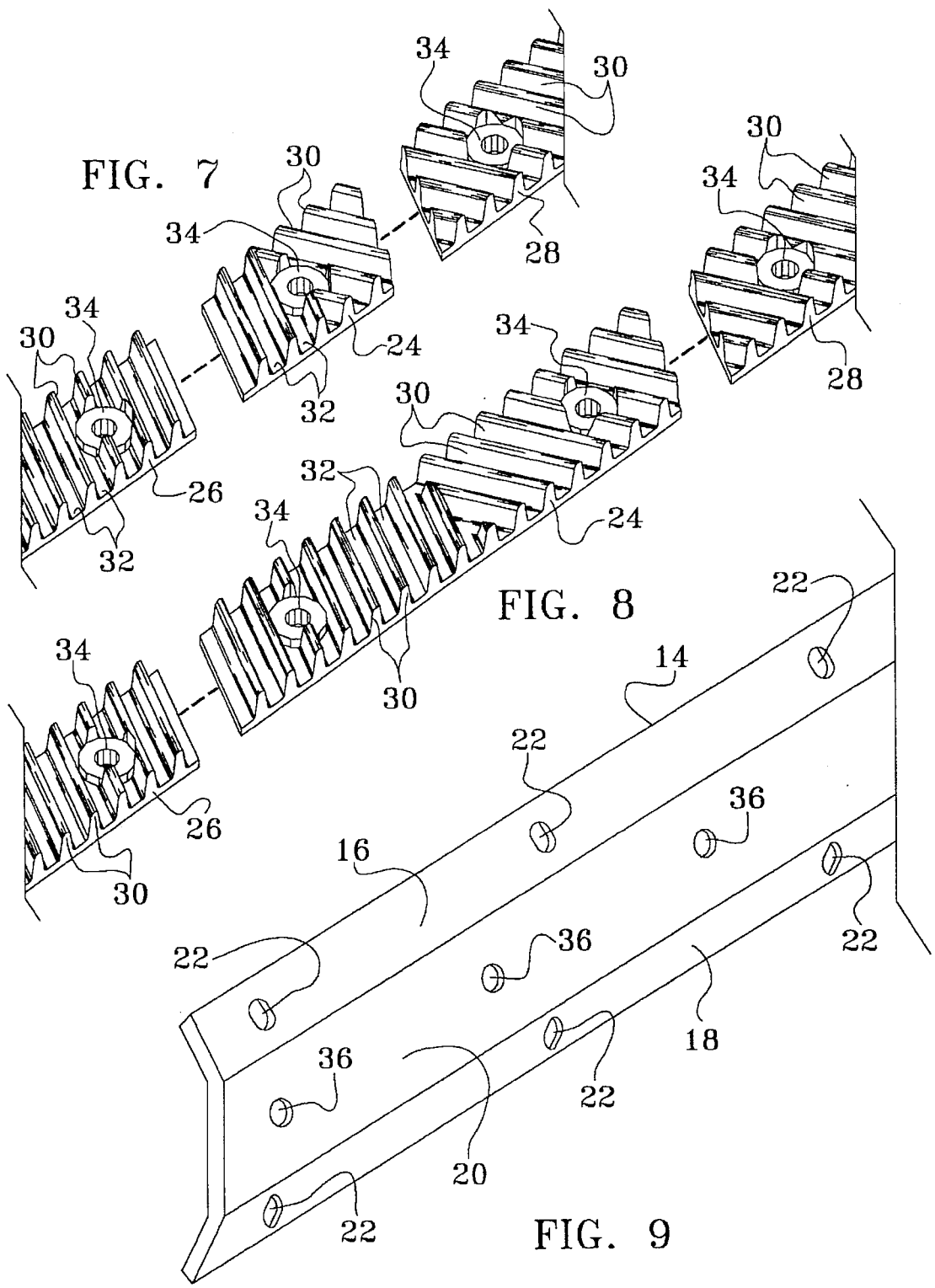

1

COMBINATION OF CYLINDER BARS USED WITH A THRESHING CYLINDER

BACKGROUND OF THE INVENTION (a) Field of the Invention

This invention relates to cylinder bars used on a threshing cylinder of a combine and more particularly, but not by way of limitation, to a combination of retrofit cylinder bars used with a backing plate for mounting on the threshing cylinder.

(b) Discussion of Prior Art

Heretofore, different models of combines have cylinder bars of different lengths and mounting configurations. Earlier models of the combines have a one piece cylinder bar which includes both a forward and reverse section. Later models of the combines have shorter sectional cylinder bars with individual forward and reverse sections. Therefore, an owner of different models of combines is required to have a large inventory of cylinder bars. The subject invention eliminates the need of carrying a large inventory of different lengths of cylinder bars for different models of combines.

U.S. Pat. No. 5,083,977 to Coers, U.S. Pat. No. 5,254,036 to Johnson et al., U.S. Pat. No. 4,889,517 to Strong et al. and U.S. Pat. No. 3,927,679 to Ausherman represent the prior art and describe the use of different types of cylinder bars or rasp bars used with combine threshing cylinders. None of these prior art sectional cylinder bars can be used on various models of combines having different lengths of threshing cylinders.

SUMMARY OF THE INVENTION

In view of the foregoing, it is an object of the present invention to provide a combination of a single length of a forward cylinder bar, a single length of a reverse cylinder bar and a center cylinder bar of different lengths which can be used with different model combines having different lengths of threshing cylinders thereby reducing inventory requirements of cylinder bars.

Another object of the invention is to reduce tooling costs by reducing the number of molds required for making the combination of cylinder bars and in turn reduce shipping costs.

Still another object of the combination of cylinder bars is after the initial installation and wear of the bars or possible breakage of factory installed cylinder bars, the replacement of the worn or broken cylinder bars is simpler and less expensive, since only smaller components of the cylinder bars are needed.

Yet another object of the invention is the balancing of the threshing cylinder is more easily accomplished since weight of smaller castings of the cylinder bars can be more easily controlled.

A further object of the invention is as the tooling wears out for the various models of combines, the original cylinder bars can be replaced by much less expensive cylinder bars using the combination of cylinder bars described herein. Also, since tooling will be less expensive, cylinder bars can be cast with tooth spacing varying with demand as required by crops and conditions. And, since cylinder bar sections are shorter, warpage in casting processes will be negligible. This means that cylinder bars can be cast in ferro-chrome alloy on other materials in order to provide a much longer operational life.

The subject combination of cylinder bars includes a forward cylinder bar, a reverse cylinder bar and a center cylinder bar, when required. The center cylinder bar is characterized by having both a forward and a reverse tooth configuration. Also, the center cylinder bar may be of various lengths depending on the length of the cylinder. Opposite side portions of the backing plate are bent to match the threshing cylinder radius. The backing plate includes bolt holes to match bolt holes on cylinder flanges on the threshing cylinder. Bolts are used to secure the backing plate to the cylinder. The three cylinder bars are mounted on a top portion of the backing plate. The top portion of the backing plate includes bolt holes to match the configuration of the bolt holes in the forward, reverse and center cylinder bar. Bolts are used for securing the cylinder bars to the backing plate. The combination of using one length of the forward cylinder bar, one length of the reverse cylinder bar and a center cylinder bar of different lengths eliminates the need of having a large inventory of various lengths of forward and reverse cylinder bars for use with different models of combines.

These and other objects of the present invention will become apparent to those familiar with threshing cylinders and problems related to the maintenance of cylinder bars from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 2 is a top view of a forward cylinder bar.

FIG. 3 is a top view of a reverse cylinder bar.

FIG. 4 is an enlarged perspective view of a portion of one end of the forward cylinder bar taken along lines 4—4 shown in FIG. 2.

FIG. 5 is an enlarged perspective view of a portion of one end of the reverse cylinder bar taken along lines 5—5 shown in FIG. 3.

FIG. 6 is a perspective view of the center cylinder bar having both a forward tooth configuration section and a reverse tooth configuration section.

FIG. 7 and 8 illustrate perspective views of the center cylinder bar having different lengths and disposed between the ends of the forward and reverse cylinder bars.

FIG. 9 is a perspective view of a portion of the backing plate used for mounting the cylinder bars on the threshing cylinder.

DESCRIPTION OF THE PREFERRED EMBODIMENTS

Figure 1:
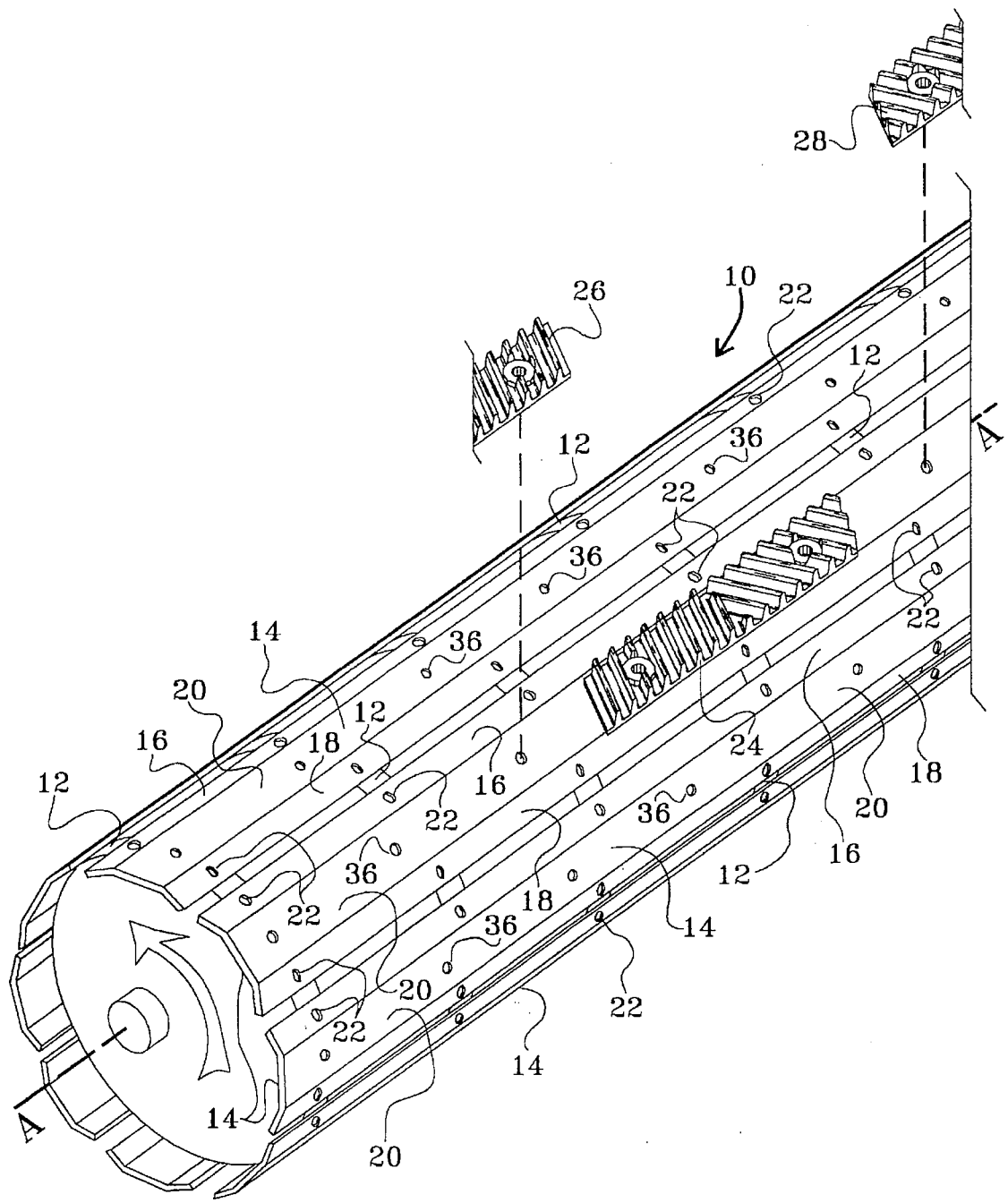
FIG. 1 is a perspective view of a portion of a threshing cylinder with a center cylinder bar mounted on one of the backing plates attached to the cylinder. Also, a portion of one end of a forward cylinder bar and one end of a reverse cylinder bar are shown positioned above the cylinder and ready for attachment next to the opposite ends of the center cylinder bar.

In FIG. 1, a perspective view of a portion of a combine's threshing cylinder is shown having a general reference numeral 10. A combine is not shown in the drawings. The cylinder 10, disposed along the length of an axis A—A, includes a plurality of flanges 12 for receiving bolts in securing backing plates 14 to the cylinder 10. The backing plates 14 are bent to match the radius of the cylinder 10 and include a first side portion 16, a second side portion 18 and a top portion 20. The first and second side portions 16 and 18 include elongated holes 22 for receiving bolts and securing the backing plates 14 to the flanges 12 of the cylinder 10. The bolts are not shown in the drawings.

Mounted on one of the backing plates 14 and centered along the length of the backing plate is a center cylinder bar 24. Disposed above the cylinder 10 and positioned for attachment next to one end of the center cylinder bar 24 is a forward cylinder bar 26. Also disposed above the cylinder 10 and positioned for attachment next to an opposite end of the center cylinder bar 24 is a reverse cylinder bar 28. Only a portion of the forward and reverse cylinder bars 26 and 28 is shown in FIG. 1. Also, it should be mentioned that during a change out of worn or broken cylinder bars, all of the top portions 20 of the backing plates 14 would receive a combination of the forward and reverse cylinder bars 26 and 28 with the center cylinder bar 24 mounted therebetween.

FIG. 2 is a top view of the forward cylinder bar 26 having a plurality of teeth 30 with valleys 32 between the teeth 30. The bar 26 also includes a number of bolt holes 34 for receiving bolts and securing the forward cylinder bar 26 to the top portion 20 of the backing plate 14.

FIG. 3 is a top view of the reverse cylinder bar 28 having a plurality of teeth 30 with valleys 32 between the teeth 30. The bar 28 also includes a number of bolt holes 34 for receiving bolts and securing the reverse cylinder bar 28 to the top portion 20 of the backing plate 14. The bolt holes 34 in the forward and reverse cylinder bars 26 and 28 are properly indexed with bolt holes 36 in the top portion 20 of the backing plates 14 shown in FIGS. 1 and 9.

FIG. 4 is an enlarged perspective view of a portion of one end of the forward cylinder bar 26 taken along lines 4—4 shown in FIG. 2. Note the teeth 30 and valleys 32 are disposed at a first angle to the length of the bar 26 and in turn at an angle to the axis A—A of the cylinder 10 for directing the grain, chaff and straw in a first direction.

FIG. 5 is an enlarged perspective view of a portion of one end of the reverse cylinder bar 28 taken along lines 5—5 shown in FIG. 3. Note the teeth 30 and valleys 32 are disposed at a second angle to the length of the bar 28 and in turn at an angle to the axis A—A of the cylinder 10 for directing the grain, chaff and straw in a second and opposite direction from the first direction as shown in FIG. 4. Obviously, the two different angles of the teeth 30 and valleys 32 of the forward and reverse cylinder bars 24 and 26 provide increase turbulence during the threshing of the grain and thus better separation of the grain from the chaff and straw.

FIG. 6 is an enlarged perspective view of the center cylinder bar 24 having a forward tooth configuration section 38 having teeth 30 and valleys 32 matching the angle of the teeth 30 and valleys 32 of the forward cylinder bar 26. Also, the bar 24 includes a reverse tooth configuration section 40 having teeth 30 and valleys 32 matching the angle of the teeth 30 and valleys 32 of the reverse cylinder bar 28. The bar 24 also includes bolt holes 34 which are indexed with bolt holes 36 in the top portion 20 of the backing plate 14.

FIG. 7 illustrates a perspective view of the center cylinder bar 24 having a shorter length than the center cylinder bar 24 shown in FIG. 8. By having different lengths of center cylinder bars 24 as shown in FIGS. 7 and 8, the forward and reverse cylinder bars 26 and 28 can be kept a standard length and a combination of the three cylinder bars 24, 26 and 28 can be used for earlier and later models of combines having different lengths of cylinders 10.

FIG. 9 is a perspective view of a portion of the backing plate 14 used for mounting the cylinder bars 24, 26 and 28 on the threshing cylinder 10. The holes 22 in the first and second side portions of the backing plate 14 have been elongated for providing adjustment of the backing plate 14 on different lengths of cylinders 10. The bolt hole holes 36 are drilled for proper indexing of the bolt holes 34 of the cylinder bars 24, 26 and 28.

While not shown in the drawings, the combination of the forward cylinder bar 26 and reverse cylinder bar 28 with the center cylinder bar 24 therebetween can be changed. For example, the center cylinder bar 24 can be mounted between two forward cylinder bars 26 and the next backing plate 14 on the cylinder 10 can have the center cylinder bar 24 disposed between two reverse cylinder bars 28. This change of bar configuration on the cylinder 10, if required, can help change the feeding characteristics of the combine and even out the flow of material being threshed.

While the invention has been particularly shown, described and illustrated in detail with reference to the preferred embodiments and modifications thereof, it should be understood by those skilled in the art that changes in form and detail may be made therein without departing from spirit and scope of the invention as claimed, except as precluded by the prior art.

The embodiments of the invention for which an exclusive privilege and property right is claimed are defined as follows:

1. A combination of cylinder bars used with a backing plate for mounting on different lengths of threshing cylinders, the cylinders used with different models of combines for the threshing of grain, chaff and straw, the combination comprising:

a forward cylinder bar adapted for mounting on the backing plate, said forward cylinder bar having teeth thereon, the teeth angled from a length of said forward cylinder bar in a first direction for directing the grain, chaff and straw in the first direction;

a reverse cylinder bar adapted for mounting on the backing plate, said reverse cylinder bar having teeth thereon, the teeth angled from a length of said reverse cylinder bar in a second direction for directing the grain, chaff and straw in the second direction; and a center cylinder bar adapted for mounting on the backing plate and disposed between said forward and reverse cylinder bars, said center cylinder bar including a forward tooth configuration section having teeth thereon and angled in the first direction and a reverse tooth configuration section having teeth thereon and angled in the second direction.

2. The combination as described in claim 1 wherein said forward and reverse cylinder bars are one length and said center cylinder bar is more than one length for conforming to different lengths of threshing cylinders.

3. The combination as described in claim 1 wherein said forward, reverse and center cylinder bars have a plurality of bolt holes therein, said bolt holes designed to index with bolt holes in the backing plate for receiving bolts and securing the cylinder bars to the backing plate.

4. A combination of cylinder bars used for mounting on different lengths of threshing cylinders, the cylinders used with different models of combines for the threshing of grain, chaff and straw, the combination comprising:

a backing plate having bolt holes therein and adapted for receiving bolts for securing said backing plate to the threshing cylinder;

a forward cylinder bar having bolt holes therein and adapted for receiving bolts for mounting on said backing plate, said forward cylinder bar having teeth thereon, the teeth angled from a length of said forward cylinder bar in a first direction for directing the grain, chaff and straw in the first direction;

a reverse cylinder bar having bolt holes therein and adapted for receiving bolts for mounting on said backing plate, said reverse cylinder bar having teeth thereon, the teeth angled from a length of said reverse cylinder bar in a second direction for directing the grain, chaff and straw in the second direction; and a center cylinder bar having bolt holes therein and adapted for receiving bolts for mounting on said backing plate, said center cylinder bar disposed between said forward and reverse cylinder bars, said center cylinder bar including a forward tooth configuration section having teeth thereon and angled in the first direction and a reverse tooth configuration section having teeth thereon and angled in the second direction.

5. The combination as described in claim 4 wherein said forward and reverse cylinder bars are one length and said center cylinder bar is more than one length for conforming to different lengths of threshing cylinders.

6. The combination as described in claim 4 wherein said backing plate includes opposite side portions along the length of said backing plate, the opposite side portion bent to match a threshing cylinder radius.

7. The combination as described in claim 4 wherein said backing plate includes a top portion, the top portion of said backing plate includes bolt holes to match a configuration of bolt holes in said forward, reverse and center cylinder bar.

8. A combination of cylinder bars mounted around and on the circumference of different lengths of threshing cylinders, the cylinders used with different models of combines for the threshing of grain, chaff and straw, the combination comprising:

a first forward cylinder bar adapted for mounting on a first backing plate attached to a threshing cylinder, said first forward cylinder bar having teeth thereon, the teeth angled from a length of said forward cylinder bar in a first direction for directing the grain, chaff and straw in the first direction;

a second forward cylinder bar adapted for mounting on said first backing plate, said second forward cylinder bar having teeth thereon, the teeth angled from a length of said second forward cylinder bar in the first direction for directing the grain, chaff and straw in the first direction; and a first center cylinder bar adapted for mounting on said first backing plate and disposed between said first forward cylinder bar and said second forward cylinder bar, said first center cylinder bar including a forward tooth configuration section having teeth thereon and angled in the first direction and a reverse tooth configuration section having teeth thereon and angled in a second direction.

9. The combination as described in claim 8 further including a first reverse cylinder bar adapted for mounting on a second backing plate attached to the threshing cylinder and disposed next to said first backing plate, said first reverse cylinder bar having teeth thereon, the teeth angled from a length of said first reverse cylinder bar in a second direction for directing the grain, chaff and straw in the second direction;

a second reverse cylinder bar adapted for mounting on said second backing plate, said second reverse cylinder bar having teeth thereon, the teeth angled from a length of said second reverse cylinder bar in the second direction for directing the grain, chaff and straw in the second direction; and a second center cylinder bar adapted for mounting on said second backing plate and disposed between said first reverse cylinder bar and said second reverse cylinder bar, said second center cylinder bar including a forward tooth configuration section having teeth thereon and angled in the first direction and a reverse tooth configuration section having teeth thereon and angled in the second direction.

10. The combination as described in claim 8 wherein said first and second forward cylinder bars are one length and said first center cylinder bar is more than one length for conforming to different lengths of threshing cylinders.

11. The combination as described in claim 9 wherein said first and second reverse cylinder bars are one length and said second center cylinder bar is more than one length for conforming to different lengths of threshing cylinders.

12. The combination as described in claim 9 wherein said first and second forward cylinder bars, said first and second reverse cylinder bars and said first and second center cylinder bars have a plurality of bolt holes therein, said bolt holes designed to index with bolt holes in said first and second backing plates for receiving bolts and securing said cylinder bars to said backing plates.

13. The combination as described in claim 8 wherein said first backing plate includes opposite side portions along the length of said first backing plate, the opposite side portion bent to match a threshing cylinder radius.

14. The combination as described in claim 9 wherein said second backing plate includes opposite side portions along the length of said second backing plate, the opposite side portion bent to match a threshing cylinder radius.

\* \* \* \* \*